United States Patent Office 3,197,405
Patented July 27, 1965

3,197,405
PHOSPHORUS- AND NITROGEN-CONTAINING COMPOSITIONS AND PROCESS FOR PREPARING THE SAME
William M. Le Suer, Cleveland, Ohio, assignor to The Lubrizol Corporation, Wickliffe, Ohio, a corporation of Ohio
No Drawing. Filed July 9, 1962, Ser. No. 208,553
24 Claims. (Cl. 252—32.7)

This application is a continuation-in-part of now abandoned U.S. application Ser. No. 125,682, filed July 21, 1961.

This invention relates to phosphorus- and nitrogen-containing compositions and to a process of preparing the same.

Although organic phosphorus and nitrogen compounds are quite effective for use as plasticizers, pesticides, weed killers, rust-inhibitors, corrosion-inhibitors, detergents, etc., they have not, generally, found wide application because of their susceptibility to thermal degradation. There is, accordingly, a great deal of interest in processes for preparing thermally stable organic phosphorus and nitrogen compounds. Accordingly it is a principal object of this invention to provide a process for preparing such phosphorus and nitrogen compounds.

It is also an object of this invention to provide novel phosphorus- and nitrogen-containing compositions.

It is also an object of this invention to provide compositions useful in hydrocarbon oils.

It is also an object of this invention to provide compositions useful especially as additives in lubricating compositions.

These and other objects are attained in accordance with this invention by providing a process for preparing phosphorus- and nitrogen-containing compositions comprising forming an acidic intermediate by the reaction of a hydroxy-substituted triester of a phosphorothioic acid with an inorganic phosphorus reagent selected from the class consisting of phosphorous acids, phosphorus oxides, and phosphorus halides and neutralizing a substantial portion of said acidic intermediate with an amine.

The hydroxy-substituted triesters of phosphorothioic acids useful in this invention include principally those having the structural formula

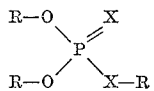

wherein R is selected from the class consisting of substantially hydrocarbon radicals and hydroxy-substituted substantially hydrocarbon radicals, at least one of the R radicals being a hydroxy-substituted substantially hydrocarbon radical, and X is selected from the class consisting of sulfur and oxygen, at least one of the X radicals being sulfur. The substantially hydrocarbon radicals include aromatic, aliphatic, and cycloaliphatic radicals such as aryl, alkyl, aralkyl, alkaryl, and cycloalkyl radicals. Such radicals may contain a polar substituent such as chloro, bromo, iodo, alkoxy, aryloxy, nitro, keto, or aldehydo group. In most instances there should be no more than one such polar group in a radical.

Specific examples of the substantially hydrocarbon radical are methyl, ethyl, isopropyl, secondary-butyl, isobutyl, n-pentyl, dodecyl, polyisobutene radical (molecular weight of 1500), cyclohexyl, cyclopentyl, 2-heptylcyclohexyl, phenyl, naphthyl, xenyl, p-heptylphenyl, 2,6-di-tertiary-butylphenyl, benzyl, phenylethyl, 3,5-dodecylphenyl, chlorophenyl, alpha-methoxy-beta-naphthyl, p-nitrophenyl, p-phenoxyphenyl, 2-bromoethyl, 3-chlorocyclohexyl, and polypropylene (molecular weight of 300)-substituted phenyl radical.

The hydroxy-substituted substantially hydrocarbon radicals include principally the above-illustrated substantially hydrocarbon radicals containing a hydroxy group. Those having less than about 8 carbon atoms are preferred because of the convenience in preparing such hydroxy-substituted triesters. Examples of such radicals are hydroxymethyl, hydroxyethyl, 2-hydroxypropyl, 3-hydroxypropyl, 2-hydroxycyclohexyl, 2-hydroxycyclopentyl, 2-hydroxy-1-octyl, 1-hydroxy-3-octyl, 1-hydroxy-2-octyl, 2-hydroxy-3-phenyl-cyclohexyl, 1-hydroxy-2-phenylethyl, 2-hydroxy-1-phenylethyl, 2-hydroxy-1-p-tolylethyl, and 2-hydroxy-3-butyl radicals. Other hydroxy-substituted substantially hydrocarbon radicals are exemplified by 2,5-dihydroxyphenyl, alpha-hydroxy-beta-naphthyl, 3-hydroxy-4-dodecyl, 3-hydroxy-6-octadecyl, and p-(p-hydroxyphenyl)-phenyl radicals.

A preferred class of the hydroxy-susbstituted triesters comprises those having the structural formula

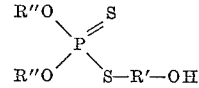

wherein R″ is a substantially hydrocarbon radical illustrated above and R′ is a bivalent substantially hydrocarbon radical such as alkylene or arylene radicals derived from the previously illustrated substantially hydrocarbon radicals. A convenient method for preparing such esters involves the reaction of a phosphorodithioic acid with an epoxide or a glycol. Such reaction is known in the art. The following equations are illustrative of the reaction.

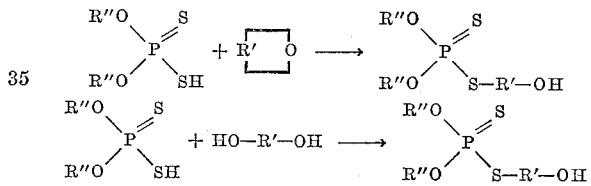

wherein

is an epoxide and HO—R′—OH is a glycol. For reasons of economy aliphatic expoxides having less than about 8 carbon atoms and styrene oxides are prefered for use in the above process. Especially useful epoxides are exemplified by ethylene oxide, propylene oxide, styrene oxide, alpha-methylstyrene oxide, p-methylstyrene oxide, cyclohexene oxide, cyclopentene oxide, dodecene oxide, octadecene oxide, 2,3-butene oxide, 1,2-butene oxide, 1,2-octene oxide, 3,4-pentene oxide, and 4-phenyl-1,2-cyclohexene oxide. Glycols include both aliphatic and aromatic di-hydroxy compounds. The latter are exemplified by hydroquinone, catechol, resorcinol, and 1,2 - dihydroxynaphthalene. Aliphatic glycols are especially useful such as ethylene glycol, trimethylene glycol, tetramethylene glycol, hexamethylene glycol, propylene glycol, pentylene glycol, decamethylene glycol, diethylene glycol, triethylene glycol, and pentaethylene glycol.

Another convenient method for preparing the hydroxy-substituted triesters comprises the addition of a phosphorodithioic acid to an unsaturated alcohol such as allyl alcohol, cinnamyl alcohol, or oleyl alcohol such as is described in U.S. Patent 2,528,723. Still another method involves the reaction of a metal phosphorothiate with a halogen-substituted alcohol. This method is described in U.S. Reissue Patent 20,411.

The phosphorodithioic acids from which the hydroxy-substituted triesters can be derived are likewise well-known. They are prepared by the reaction of phosphorus pentasulfide with an alcohol or a phenol. The reaction involves 4 moles of the alcohol or phenol per mole of phosphorus pentasulfide and may be carried out within the temperature range from about 50° C. to about 200° C. Thus the preparation of O,O'-di-n-hexylphosphorodithioic acid involves the reaction of phosphorus pentasulfide with 4 moles of n-hexyl alcohol at about 100° C. for about 2 hours. Hydrogen sulfide is liberated and the residue is the defined acid. The preparation of the phosphoromonothioic acid may be effected by treatment of corresponding phosphorodithioic acid with steam. Phosphorotrithioic acids and phosphorotetrathioic acids can be obtained by the reaction of phosphorus pentasulfide with mercaptans or mixtures of mercaptans and alcohols.

The reaction of phosphorus pentasulfide with a mixture of phenols or alcohols (e.g., isobutanol and n-hexanol in 2:1 weight ratio) results in phosphorodithioic acids in which the two organic radicals are different. Such acids likewise are useful herein.

The inorganic phosphorus reagent useful in the reaction with the hydroxy-substituted triesters of phosphorothioic acids is preferably phosphorus pentoxide. Other phosphorus oxides such as phosphorus trioxide and phosphorus tetroxide likewise are useful. Also useful are phosphorus acids, and phosphorus halides. They are exemplified by phosphoric acid, pyrophosphoric acid, metaphosphoric acid, hypophosphoric acid, phosphorous acid, pyrophosphorous acid, metaphosphorous acid, hypophosphorous acid, phosphorus trichloride, phosphorus tribromide, phosphorus pentachloride, monobromophosphorus tetrachloride, phosphorus oxychloride, and phosphorus triiodide.

The reaction of the hydroxy-substituted triesters of phosphorothioic acids with the inorganic phosphorus reagent results in an acidic product. The chemical constitution of the acidic product depends to a large measure on the nature of the inorganic phosphorus reagent used. In most instances the product is a complex mixture the precise composition of which is not known. It is known, however, that the reaction involves the hydroxy radical of the triester with the inorganic phosphorus reagent. In this respect the reaction may be likened to that of an alcohol or a phenol with the inorganic phosphorus reagent. Thus, the reaction of the hydroxy-substituted triester with phosphorus pentoxide is believed to result principally in acidic phosphates, i.e., mono- or di-esters of phosphoric acid in which the ester radical is the residue obtained by the removal of the hydroxy radical of the phosphorothioic triester reactant. The product may also contain phosphonic acids and phosphinic acids in which one or two direct carbon-to-phosphorus linkages are present.

The acidic product of the reaction between the hydroxy-substituted triester with phosphorus oxyhalide or phosphoric acid is believed to result in similar mixtures of acidic phosphates, phosphonic acids, and/or phosphinic acids. On the other hand, the reaction of the hydroxy-substituted triester with phosphorus trichloride or phosphorous acid is believed to result principally in acidic organic phosphites. Still other products may be obtained from the use of other inorganic phosphorus reagents illustrated previously. In any event, the product is acidic and as such is useful as the intermediate for the preparation of the neutralized products of this invention.

Usually, from about 2 moles to about 5 moles of the triester is used for each mole of the inorganic phosphorus reagent. The preferred proportion of the triester is about 3-4 moles for each mole of the phosphorus reagent. The use of amounts of either reactant outside the limits indicated here results in excessive unused amounts of the reactant and is ordinarily not preferred.

The reaction of the hydroxy-substituted triester with the inorganic phosphorus reagent to produce the acidic intermediate can be effected simply by mixing the two reactants at a temperature above about room temperature, preferably above about 50° C. A higher temperature such as 100° C. or 150° C. may be used but ordinarily is unnecessary.

The amines useful for neutralizing the acidic intermediate may be aliphatic amines, aromatic amines, cycloaliphatic amines, heterocyclic amines, or carbocyclic amines. Amines having from about 4 to about 30 aliphatic carbon atoms are preferred and aliphatic primary amines containing at least about 8 carbon atoms and having the formula, $R''-NH_2$, where $R''$ is, for example, an aliphatic radical such as tert-octyl, tert-dodecyl, tert-tetradecyl, tert-octadecyl, cetyl, behenyl, stearyl, eicosyl, docosyl, tetracosyl, hexatriacontanyl, and pentahexacontanyl, are especially useful. Examples of other aliphatic amines include cyclohexyl amine, n-hexylamine, dodecyl-amine, di-dodecylamine, tridodecylamine, N-methyl-octylamine, butylamine, behenylamine, stearyl amine, oleyl amine, myristyl amine, and N-dodecyl trimethylene diamine, aniline, o-toluidine, benzidine, phenylene diamine, N,N'-di-sec-butylphenylene diamine, beta-naphthylamine, alpha-naphthylamine, morpholine, piperazine, menthane diamine, cyclopentyl amine, ethylene diamine, hexamethylene tetramine, octamethylene diamine, and N,N'-dibutyl-phenylene diamine. Also useful are hydroxy-substituted amines such as ethanolamine, diethanolamine, triethanolamine, isopropanolamine, para-aminophenol, 4-amino-naphthol-1, 8-amino-naphthol-1, beta-aminoalizarin, 2-amino-2-ethyl-1,3-propanediol, 4-amino-4'-hydroxy-diphenyl ether, 2-amino-resorcinol, etc.

Of the various available hydroxy-substituted amines which can be employed, a preference is expressed for hydroxy-substituted aliphatic amines, particularly those which conform for the most part to the formula

wherein $R''$ is as previously defined; A is a lower alkylene radical such as methylene, ethylene, propylene-1,2, trimethylene, butylene-1,2, tetramethylene, amylene-1,3, pentamethylene, etc.; $x$ is 1–10, inclusive; and Q is hydrogen, $(AO)_xH$, or $R''$. The use of such hydroxy-substituted aliphatic amines in many instances imparts improved rust-inhibiting characteristics to the phosphorus and nitrogen-containing compositions of this invention. Examples of such preferred hydroxy-substituted aliphatic amines include N-4-hydroxybutyl-dodecyl amine, N-2-hydroxyethyl-n-octylamine, N-2-hydroxypropyl dinonylamine, N,N-di-(3-hydroxypropyl)-tert-dodecyl amine, N-hydroxytriethoxyethyl-tert-tetradecyl amine, N-2-hydroxyethyl-tert-dodecyl amine, N-hydroxyhexapropoxypropyl-tert-octadecyl amine, N-5-hydroxypentyl di-n-decyl amine, etc. A convenient and economical method for the preparation of such hydroxy-substituted aliphatic amines involves the known reaction of an aliphatic primary or secondary amine with at least about an equimolecular amount of an epoxide, preferably in the presence of a suitable catalyst such as sodium methoxide, sodamide, sodium metal, etc.

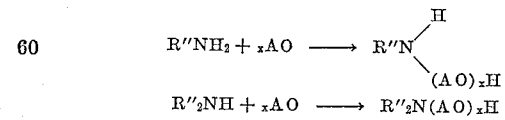

In the above formulas, $R''$, $x$, and A are as previously defined. A particular preference is expressed for N-monohydroxyalkyl substituted mono-tertiary-alkyl amines of the formula tert-R—NHAOH, wherein tert-R is a tertiary-alkyl radical containing from about 11 to about 24 carbon atoms. In lieu of a single compound of the formula tert-R—NHAOH, it is often convenient and desirable to use a mixture of such compounds prepared, for example, by the reaction of an epoxide such as ethylene oxide, propylene oxide, or butylene oxide with a commercial mixture of tertiary-alkyl primary amines such as $C_{11}$–$C_{14}$ tertiary-alkyl primary amines, $C_{18}$–$C_{22}$ tertiary-alkyl primary amines, etc.

The neutralization of the acidic intermediate with the amine is in most instances exothermic and can be carried out simply by mixing the reactants at ordinary temperatures, preferably from about 0° C. to about 200° C. The chemical constitution of the neutralized product of the reaction depends to a large extent upon the temperature. Thus, at a relatively low temperature, such as less than about 80° C., the product comprises predominantly a salt of the amine with the acid. At a temperature above 100° C., the product may contain amides, amidines, or mixtures thereof. However, the reaction of the acidic intermediate with a tertiary amine results only in a salt.

The relative proportions of the acidic intermediate and the amines used in the reaction are preferably such that a substantial portion of the acidic intermediate is neutralized. The lower limit as to the amount of amine used in the reaction is based primarily upon a consideration of the utility of the product formed. In most instances, enough amine should be used as to neutralize at least about 50% of the acidity of the intermediate. For use as additives in hydrocarbon oils, substantially neutral products such as are obtained by neutralization of at least about 90% of the acidity of the intermediate are desirable, whereas for use as insecticides or rust-preventive agents for treatment of metals, products obtained by neutralizing as little as about 50% of the acidity of the intermediate are effective. Thus the amount of the amine used may vary within wide ranges depending upon the acidity desired in the product and also upon the acidity of the intermediate as determined by, for example, ASTM procedure designation D–664 or D–974.

The following examples are illustrative of the process for preparing the phosphorus- and nitrogen-containing compositions of this invention.

EXAMPLE 1

Phosphorus pentoxide (64 grams, 0.45 mole) is added at 58° C. within a period of 45 minutes to hydroxypropyl O,O-di(4-methyl-2-pentyl)phosphorodithioate (514 grams, 1.35 moles, prepared by treating di(4-methyl-2-pentyl)-phosphorodithioic acid with 1.3 moles of propylene oxide at 25° C.). The mixture is heated at 75° C. for 2.5 hours, mixed with a filtering aid, and filtered at 70° C. The filtrate is found to have a phosphorus content of 11.8%, a sulfur content of 15.2%, and an acid number of 87 (bromophenol blue indicator). To 217 grams (0.5 equivalent) of the above acidic filtrate there is added at 25° to 60° C. within a period of 20 minutes, 66 grams (0.35 equivalent) of a commercial aliphatic primary amine having an average molecular weight of 191 in which the aliphatic radical is a mixture of tertiary-alkyl radicals containing from 11 to 14 carbon atoms. The partially neutralized product is found to have a phosphorus content of 10.2%, a nitrogen content of 1.5%, and an acid number of 26.3.

EXAMPLE 2

A mixture of 442 grams (0.925 mole) of hydroxypropyl O,O'-bis(dichlorophenyl)phosphorodithioate (prepared by the reaction of bis(dichlorophenyl) phosphorodithioic acid with 1.1 moles of propylene oxide at 30°–90° C.) and 43.6 grams (0.308 mole) of phosphorus pentoxide is heated at 140° C. for 0.5 hour, at 120–125° C. for three hours, and at 155°–160° C. for one hour. The product is found to have an acid number of 83 (bromophenol blue indicator). The acidic intermediate is neutralized by treatment with 238 grams of a commercial aliphatic primary amine having an average molecular weight of 315 in which the aliphatic radical is a mixture of tertiary alkyl radicals containing from 18 to 22 carbon atoms at 110°–120° C. for 2.5 hours. The neutralized product is filtered and the filtrate is found to have a phosphorus content of 5.4%, a sulfur content of 8.2%, a chlorine content of 17.8%, a nitrogen content of 1.5%, and an acid number of 3.5.

EXAMPLE 3

A mixture of 308 grams (2.68 moles) of phosphorus pentoxide and 2424 grams (6.5 moles) of hydroxyethyl O,O'-di(4-methyl-2-pentyl)phosphorodithioate is heated at 80°–90° C. for 7.5 hours and filtered. The filtrate has an acid number of 131 (phenolphthalein indicator). A portion (1981 grams) of the above filtrate is neutralized by treatment with a stoichiometrically equivalent amount (887 grams) of the aliphatic primary amine of Example 1 at room temperature. The neutralized product is filtered and the filtrate is found to have a sulfur content of 12.3%, a phosphorus content of 9.9%, and a nitrogen content of 1.3%.

EXAMPLE 4

A mixture of 667 grams (4.7 moles) of phosphorus pentoxide and the hydroxypropyl O,O'-diisopropylphosphorodithioate prepared by the reaction of 3514 grams of diisopropyl phosphorodithioic acid with 986 grams of propylene oxide at 50° C. is heated at 85° C. for 3 hours and filtered. The filtrate has a phosphorus content of 15.3%, a sulfur content of 19.6%, and an acid number of 126 (bromophenol blue indicator). A portion of the filtrate (1752 grams) is then neutralized by treatment with a stoichiometrically equivalent amount (764 grams) of the aliphatic primary amine of Example 1 at 25°–82° C. The neutralized product has a phosphorus content of 9.95%, a nitrogen content of 2.72%, and a sulfur content of 12.6%.

EXAMPLE 5

A mixture of 710 grams (5 moles) of phosphorus pentoxide and the hydroxypropyl O,O'-di(4-methyl-2-pentyl)-phosphorodithioate obtained by the reaction of 4935 grams of di(4-methyl-2-pentyl)phosphorodithioic acid with 957 grams of propylene oxide is heated at 75°–80° C. for 2 hours and filtered. The filtrate has a phosphorus content of 12.8%, a sulfur content of 15.9%, and an acid number of 118 (phenolphthalein indicator). A portion (475 grams) of the acidic filtrate is then neutralized by treatment with a stoichiometrically equivalent amount of an amine mixture consisting of 35 grams of the aliphatic primary amine of Example 1 and 35 grams of a commercial polyethylene polyamine having an average composition corresponding to that of tetraethylene pentamine at 30°–42° C.

EXAMPLE 6

A mixture of 35 grams (0.246 mole) of phosphorus pentoxide and 286 grams (0.98 mole) of hydroxypropyl O,O'-di-isopropylphosphorodithioate is heated at 70°–80° C. for 3 hours. The product has a phosphorus content of 14.3%, a sulfur content of 20%, and an acid number of 154 (phenolphthalein indicator). A portion (280 grams) of the acidic product is then neutralized by treatment with a stoichiometrically equivalent amount (147 grams) of the aliphatic primary amine of Example 1 at 30°–45° C. for 2 hours. The neutralized product is filtered and the filtrate has a phosphorus content of 9.1%, a sulfur content of 13.2%, and a nitrogen content of 2.6%.

EXAMPLE 7

Phosphorus pentoxide (403 grams) is added at 75° C. within a period of 2.75 hours to 5200 grams of hydroxypropyl O,O'-di(4-methyl - 2 - pentyl)phosphorodithioate. The mixture is heated at 75° C. for 5.5 hours and the liquid acidic product separated. To 3415 grams of the liquid there is added at 25° C. to 75° C. within a period of 45 minutes the aliphatic primary amine (1959 grams) of Example 1. The product is then filtered. The filtrate is found to have a phosphorus content of 7.77%, a sulfur content of 10.81%, and a nitrogen content of 2.64%.

EXAMPLE 8

Phosphorus pentoxide (142 grams) is added at 75° C. within a period of 1.2 hours to 1500 grams of hydroxypropyl O,O'-di(4-methyl - 2 - pentyl)phosphorodithioate. The mixture is heated at 75° C. for 3.5 hours and the liquid acidic product separated. The liquid product is found to have an acid number of 83 (bromphenol blue indicator). To 1591 grams of the liquid there is added at 70° C. within a period of 15 minutes 700 grams of the aliphatic primary amine of Example 1. The product is filtered. The filtrate is found to have a phosphorus content of 7.95%, a sulfur content of 10.75%, a nitrogen content of 2.21%, and a base number of 25.

EXAMPLE 9

Phosphorus pentoxide (64 grams) is added to 514 grams of hydroxypropyl O,O'-di(4-methyl-2-pentyl)-phosphorodithioate at room temperature to 58° C. within a period of 45 minutes. The reaction is exothermic. The reaction mixture is heated to 78° C. and held at this temperature for 2.5 hours. The reaction mixture is filtered at 70° C. The filtrate is found to have a phosphorus content of 11.8%, a sulfur content of 11.8%, and an acid number of 87 (bromphenol blue indicator). To 150 grams of the acidic filtrate there is added dropwise at room temperature within a period of 1 hour, 124 grams of the aliphatic amine of Example 2. An exothermic reaction occurs, the temperature of this completed reaction mixture being 54° C. The reaction mixture is heated to 80° C., held for 3 hours at that temperature, and filtered at 65° C. The filtrate is found to have a phosphorus content of 4.5%, a sulfur content of 8.57%, a nitrogen content of 1.96%, and a base number of 20.

EXAMPLE 10

Phosphorus pentoxide (331 grams, 2.35 moles) is added to hydroxybutyl O,O'-diisopropylphosphorodithioate (prepared by the reaction of 1.2 moles of butyleneoxide with diisopropylphosphorodithioic acid at 10° C. to 20° C.) at 30° C. to 60° C. within a period of 1.5 hours. The mixture is heated to 80° C. and held at that temperature for 3 hours. The reaction product is found to have a phosphorus content of 13.1%, a sulfur content of 19.1%, and an acid number of 114 (bromphenol blue indicator). To 2424 grams of the acidic product there is added 1520 grams of the aliphatic primary amine of Example 1 at 30° C. to 50° C. within a period of 1 hour. The latter mixture is further mixed for 1 hour and filtered. The filtrate is found to have a phosphorus content of 8.64%, a sulfur content of 11.6%, a nitrogen content of 2.83%, and a base number of 29.

EXAMPLE 11

Phosphorus pentoxide (208 grams, 1.41 moles) is added at 50° C. to 60° C. to hydroxypropyl O,O'-diisobutylphosphorodithioate (prepared by reacting 280 grams of propylene oxide with 1184 grams of O,O'-diisobutylphosphorodithioic acid at 30° C. to 60° C). The reaction mixture is heated to 80° C. and held at that temperature for 2 hours. To the acidic reaction mixture there is added a stoichiometrically equivalent amount (385 grams) of the commercial aliphatic primary amine of Example 1 to 30° C to 60° C. The produce is filtered. The filtrate is found to have a phosphorus content of 9.31%, a sulfur content of 11.37%, a nitrogen content of 2.50%, and a base number of 6.9 (bromphenol blue indicator).

EXAMPLE 12

Phosphorous pentoxide (53 grams, 0.35 mole) is added to 430 grams (1.14 moles) of hydroxypropyl O,O'di-(4-methyl-2-pentyl)phosphorodithioate at 60°–63° C. within a period of 55 hours. The reaction mixture is heated to 75°–80° C. and held at that temperature for 2 hours. To this reaction mixture there is added 219 grams of the commercial aliphatic primary amine of Example 1 at temperatures below 30°–60° C. within a period of 1.5 hours. The product is maintained at 50°–60° C. for 0.5 hour and filtered. The filtrate is found to have a phosphorous content of 8%, a sulfur content of 10.4%, a nitrogen content of 2.2%, and a base number of 23 (bromphenol blue indicator).

EXAMPLE 13

Phosphorus pentoxide (42 grams, 0.3 mole) is added to 455 grams (0.9 mole) of 3-chloro-hydroxypropyl O,O'-diisooctylphosphorodithioate (prepared by reacting 1 mole of O,O'-diisooctylphosphorodithioic acid with 1 mole of epichlorohydrin at room temperature to 65° C.) at 75° C. within a 45 minute period. The acidic reaction mixture is heated to 75° C., held at that temperature for 3 hours, and filtered. To the acidic filtrate (415 grams) there is added 191 grams of the aliphatic primary amine of Example 1 at room temperature to 60° C. within 0.5 hour. The reaction mixture is filtered. The filtrate is found to have a phosphorus content of 6.54%, a sulfur content of 8.45%, a chlorine content of 4.23%, and a base number of 12 (bromphenol blue indicator).

EXAMPLE 14

Phosphorus pentoxide (38 grams) is added to 298 grams of hydroxypropyl O,O'-di(4-methyl-2-pentyl)phosphoromonothioate (prepared by the reaction of 52 grams of propylene oxide with 279 grams of O,O'-di-(4-methyl-2-pentyl)phosphoromonothioic acid at room temperature to 65° C.) at 75° C. within a period of 1.5 hours. The acidic reaction mixture is held at 75° C. for 3 hours and filtered. To 204 grams of the acidic filtrate there is added 191 grams of the commercial aliphatic primary amine of Example 1 at room temperature to 65° C. within a period of 0.5 hour. The product is found to have a phosphorus content of 6.47%, a sulfur content of 5.38%, a nitrogen content of 3.58%, and a base number of 74 (bromphenol blue indicator).

EXAMPLE 15

Phosphorus pentoxide (42 grams) is added to 405 grams of phenyl - hydroxyethyl O,O' - di - (4-methyl-2-pentyl) phosphorodithioate (prepared by reacting O,O'-di-(4-methyl-2- pentyl)phosphorodithioic acid with one mole of styrene oxide at room temperature of 650 C.) at 75° C. within 1.5 hours. The acid reaction mixture is held at 75° C. for 3 hours and filtered. To 372 grams of the acidic filtrate there is added 229 grams of the commercial aliphatic primary amine of Example 1 at room temperature to 56° C. within 0.5 hour. The product is found to have a phosphorus content of 6.52%, a sulfur content of 8.13%, a nitrogen content of 2.85%, and a base number of 46 (bromphenol blue indicator).

EXAMPLE 16

Phosphorous pentoxide (33 grams is added to 297 grams of hydroxyoctyl dicyclohexylphosphorodithioate (prepared by reacting dicyclohexylphosphorodithioic acid with one mole of 1,2-octene oxide at room temperature to 60° C.) at 75° C. within a 45 minute period. The acidic reaction mixture is held at 75° C. for 4 hours and filtered. To 235 grams of the acidic filtrate there is added 115 grams of the commercial aliphatic primary amine of Example 1 at room temperature to 65° C. within 15 minutes. The product is found to have a phosphorus content of 6.87%, a sulfur content of 9.00%, a nitrogen content of 2.32%, and a base number of 19 (bromphenol blue indicator).

EXAMPLE 17

Phosphorus pentoxide (55.8 grams, 0.39 mole) is added at 60°–90° C. to 1358 grams (1.18 moles) of hydroxypropyl O,O'-bis-(polyisobutene (molecular weight of 350)-substituted phenyl)phosphorodithioate. The mixture is heated at 110° C. for 6.5 hours and filtered. The filtrate has a phosphorus content of 4.3%, a sulfur content of 5%, and an acid number of 46 (bromphenol blue). To 448 grams of this filtrate, there is added at 65°–84° C., 100 grams of a commercial grade N-aminopropyl tallow amine having a nitrogen content of 7% and the resulting mixture heated at 85° C. for 40 minutes. The product is found to have a phosphorus content of 3.5%, a nitrogen content of 1.4%, and a base number of 10.

EXAMPLE 18

To 224 grams of the filtrated of Example 17 there is added 36 grams (0.25 mole) of alpha-naphthylamine at 89° C. within 12 minutes. The product is found to have a phosphorus content of 3.6%, a nitrogen content of 1.3%, and an acid number of 44.

EXAMPLE 19

Phosphorus pentoxide (90 grams, 1.89 moles) is added to 1062 grams (1.69 moles) of hydroxypropyl O,O'-di-hepthylphenylphosphorodithioate at room temperature to 61° C. within 1 hour. The mixture is heated to 100° C., held at this temperature for 3.5 hours, and filtered at 85° C. The filtrate is found to have a phosphorus content of 7.6%, a sulfur content of 10.8%, and an acid number of 70 (bromphenol blue indicator). To 225 grams (0.280 mole) there is added 37 grams (0.374 mole) of cyclohexylamine at 42° to 93° C. The mixture is stirred for an additional 10 minutes at 83° C. The product is found to have a phosphorus content of 6.45%, a nitrogen content of 1.97%, and a base number of 6.

EXAMPLE 20

To 224 grams (0.280 mole) of the filtrate of Example 19 there is added 11.5 grams (0.187 mole) of ethylene diamine at 40°–95° C. The mixture is stirred for an additional 5 minutes at 95° C. The product is found to have a phosphorus content of 7.31%, a nitrogen content of 1.98%, and a base number of 2.

EXAMPLE 21

Phosphorus thiochloride (84.5 grams, 0.5 mole) is added to 592 grams (1.5 moles) of hydroxypropyl O,O'-di(4-methyl-2-pentyl)phosphorodithioate at 30° C. The acidic reaction mixture is heated to 85° C., held for 6 hours at this temperature, and mixed with 281 grams (1.5 moles) of the aliphatic primary amine of Example 1 at 30° C. to 60° C. The product is found to have a phosphorus content of 6.85%, a sulfur content of 11.86%, a nitrogen content of 2.18%, and an acid number of 0.9 (bromphenol blue indicator).

EXAMPLE 22

Phosphoric acid (85% aqueous solution) (230 grams, 2 moles) is added to 1170 grams (3 moles) of hydroxypropyl O,O'-di(4-methyl-2-pentyl)phosphorodithioate at 30° C. The mixture is heated to 70° C./20 mm., and then heated at 78° C. for 8 hours. During the period, 83 grams of distillate is collected. The residue is filtered. To 1129 grams of the filtrate there is added 845 grams of the aliphatic primary amine of Example 1 at 30°–70° C. The product is filtered at 65° C. and the filtrate found to have a phosphorus content of 7.3%, a sulfur content of 8.64%, a nitrogen content of 2.95%, and a base number of 4 (bromphenol blue indicator).

EXAMPLE 23

Phosphorus trichloride (46 grams, 0.33 mole) is added to 388 grams (1 mole) of hydroxypropyl O,O'-di(4-methyl-2-pentyl)phosphorodithioate at room temperature within 30 minutes. The mixture is heated to 80° C./15 mm. within a 3 hour period. To the acidic residue (393 grams) there is added 117 grams of the aliphatic primary amine of Example 1 at room temperature to 45° C. The product is found to have a phosphorus content of 8.02%, a sulfur content of 12.72%, a nitrogen content of 1.64%, and a base number of 41 (bromphenol blue indicator).

EXAMPLE 24

2292 grams (12 moles) of a commercial mixture of $C_{11}$ to $C_{14}$ tertiary-alkyl primary amines having an average molecular weight of 191 is placed in a reaction vessel and heated to 170° C. Sodium metal catalyst (0.6 gram) is added and then 528 grams (12 moles) of ethylene oxide is introduced into the reaction vessel over a period of 25 hours at 165°–175° C. Thereafter, the whole is stripped at 110° C./20 mm. Hg, diluted with 500 ml. of benzene, water-washed, dried by azeotropic distillation, and filtered. The filtrate is the desired N-2-hydroxyethyl substituted amine mixture containing 6.02% nitrogen (theory, 5.96%) and having a neutral equivalent of 236 (theory, 235).

2330 grams (5 equivalents) of phosphorus pentoxide-treated hydroxypropyl O,O-di-(4-methyl-2-pentyl)phosphorodithioate prepared in a manner similar to that set forth in Example 1 is introduced into a reaction vessel and stirred. Thereupon, 1180 grams (5 equivalents) of the above-described N-2-hydroxyethyl substituted amine mixture is added dropwise over a period of 0.75 hour. An exothermic reaction causes the temperature to rise to 60° C. After all of the amine has been added, the whole is stirred for 2 hours. The resulting neutralized product is found to have a phosphorus content of 8.05%, a nitrogen content of 2.03%, a sulfur content of 10.16%, and a base number of 29 bromphenol blue indicator).

EXAMPLE 25

296 grams (4 moles) of isobutanol and 222 grams (1 mole) of phosphorus pentasulfide are stirred for 5 hours at 75° C. to yield O,O'-di-isobutyl phosphorodithioic acid. Thereafter, 102 grams (1.76 moles) of propylene oxide is added over a period of 0.25 hour at 50° C. to yield hydroxypropyl O,O'-di-isobutyl phosphorodithioate, which latter compound is stirred for 5 hours at 70°–80° C. with 83 grams (0.59 mole) of phosphorus pentoxide to prepare an acidic phosphorus- and sulfur-containing intermediate having an acid number of 163 (phenolphthalein indicator).

A chemically equivalent amount (440 grams) of the N-2-hydroxyethyl substituted amine mixture described in Example 24 is added to the acidic phosphorus- and sulfur-containing intermediate over a period of 0.5 hour at 65° C. The resulting neutralized product is found to have a phosphorus content of 8.74%, a nitrogen content of 2.43%, a sulfur content of 11.19%, and a base number of 26 (bromphenol blue indicator).

The phosphorus- and nitrogen-containing compositions of this invention are useful as insecticides, corrosion-inhibitors, rust-inhibitors, anti-wear agents, etc. To illustrate, they may be incorporated in insecticidal emulsions or atomized sprays at concentrations ranging from about 0.01% to about 5% by weight. A more specific example is an emulsion comprising 97 parts (by weight) of water, 1 part of sodium dodecylbenzene sulfonate as the emulsifier, and 2 parts of a kerosene solution containing 40% of the product of Example 2. This emulsion is effective in controlling infestation of aphids on vegetation.

The use of the phosphorus- and nitrogen-containing compositions in cutting oils is illustrated by a composition comprising SAE 10 mineral oil containing 2.5% by weight of the product of Example 17.

The phosphorus- and nitrogen-containing compositions of this invention are especially effective as corrosion-inhibiting and extreme pressure additives in lubricating compositions. When used as lubricant additives, those derived from phosphorothioic acids in which the ester radicals contain a total of at least about 7.6 aliphatic carbon atoms per phosphorus atom are preferred because of their greater oil-solubility and compatibility with other additives which may be present in the lubricant.

The lubricating oils in which the compositions of this invention are useful as additives may be of synthetic, animal, vegetable, or mineral origin. Ordinarily mineral lubricating coils are preferred by reason of their availability, general excellence, and low cost. For certain applications, oils belonging to one of the other free groups may be preferred. For instance, synthetic polyester oils such as didodecyl adipate and di-2-ethylhexyl sebacate are often preferred as jet engine lubricants. Normally the lubricating oils preferred will be fluid oils ranging in viscosity from about 40 Saybolt Universal Seconds at 100° F. to about 200 Saybolt Universal Seconds at 210° F.

The concentration of the phosphorus- and nitrogen-containing compositions of this invention to be used in a lubricant depends primarily upon the type of oil used and the nature of the service to which the lubricating composition is to be subjected. In most instances the concentration will range from about 0.001% to about 10% by weight of the additive in a lubricant. More particularly, for example, a lubricant for gasoline internal combustion engines usually contains from about 0.05% to about 5% by weight of the additive, whereas a lubricant for diesel engines usually contains from about 0.1% to about 10% by weight of the additive. On the other hand, a lubricant for 2-cycle engines may contain as little as 0.01% or less of the additive and a lubricant for power transmitting units such as gears or axles usually contains from about 0.5% to 5% of the additive.

Other additives which can be used in conjunction with the phosphorus- and nitrogen-containing compositions of this invention in lubricants include principally detergents of both ashless and ash-containing types, supplemental corrosion-inhibiting agents, supplemental extreme pressure improving agents, rust-inhibiting additives, pour point depressant agent, viscosity index improving agents, anti-foam agents, oxidation-inhibiting agents, etc.

A particularly effective combination of additives for use in lubricants for automobile transmissions, gears, or axles comprises the phosphorus- and nitrogen-containing compositions of this invention together with a substantially hydrocarbon polysulfide. Lubricants containing such combination of additives are characterized by non-corrosiveness, improved stability against oxidative and thermal degradation, and the ability to provide effective lubrication in changing operating environments wherein shock load, high speed, and high torque demands are made both cyclically or in sequence on the lubricant.

The substantially hydrocarbon polysulfides which are especially useful for this purpose include principally aliphatic, cycloaliphatic, and aromatic disulfides, trisulfides, tetrasulfides, pentasulfides, or higher polysulfides. The term "polysulfide" as used herein designates compounds in which two substantially hydrocarbon radicals are joined to a group consisting of at least 2 sulfur atoms. Such polysulfides are represented, for the most part, by any of the structural formulas below.

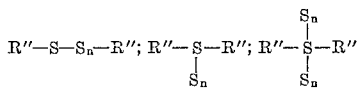

wherein $R''$ is a substantially hydrocarbon radical such as illustrated previously and $n$ is an integer preferably less than 6. The nature of the linkage between the sulfur atoms is not clearly understood, although it is believed that such linkage may be described by a single covalent bond, a double bond, or a coordinate covalent bond.

Polysulfides preferred for use herein are alkyl polysulfides, cycloalkyl polysulfides, aralkyl polysulfides, aryl polysulfides, alkaryl polysulfides, or polysulfides having a mixture of such hydrocarbon radicals. The polysulfides containing at least about 6 carbon atoms per molecule have greater oil solubility and are generally preferred. Specific examples of such polysulfides are diisobutyl trisulfide, diisopentyl trisulfide, di-n-butyl tetrasulfide, dicyclopentyl disulfide, di-methylcyclohexyl tetrasulfide, di-2-ethylcyclopentyl disulfide, dipentyl trisulfide, beta-pinyl pentasulfide, dibenzyl disulfide, benzyl isooctyl disulfide, diphenyl disulfide, cyclohexyl cyclopentyl trisulfide, alpha-butyl-beta-naphthyl trisulfide, bis(polyisobutene (molecular weight of 1000)-substituted-phenyl)disulfide, ditolyl disulfide, di-paraffin wax trisulfide di-terpenyl disulfide, bis(o,p-diisopropylphenyl)tetrasulfide, didodecyl trisulfide, dibehenyl trisulfide, and isobutyl cyclohexyl tetrasulfide. Other polysulfides such as polar substituted polysulfides are exemplified by di(p-chlorobenzyl)disulfide, di-(omega-bromopentyl)trisulfide, di(p-butoxyphenyl)disulfide, and di(o-nitro-p-heptylphenyl)disulfide.

The preparation of the polysulfides may be accomplished by any of the various processes which are known and disclosed in the art including, for example, the reaction of a chlorohydrocarbon with an alkali metal polysulfide, the reaction of a mercaptan or a thiophenol with sulfur and/or sulfur halide, the reaction of saturated and unsaturated hydrocarbons with sulfur and/or sulfur halide, the reaction of a hydrocarbon monosulfide with sulfur, etc.

The concentration of the polysulfide in a lubricant is usually from about 0.05% to about 10% by weight.

Detergents useful in conjunction with the phosphorus- and nitrogen-containing composition in lubricants include normal or basic salts of petroleum naphthenic acids, petroleum sulfonic acids, oil-soluble fatty acids, etc.; and ashless detergents such as the neutralization product of triethylene tetramine with an alkenyl substituted succinic anhydride having 50 carbon atoms in the alkenyl substituent and the copolymer of 5 parts of beta-diethylaminoethyl acrylate with 95 parts of dodecyl methacrylate. Oxidation-inhibitors useful in such lubricants include, e.g., basic metal petroleum sulfonates, metal phenates, amines, benzyl thiocyanates, etc. Film strength agents include, e.g., chlorinated paraffin oils containing from 20 to 70% of chlorine, chlorinated eicosane wax containing from 50 to 60% of chlorine, hexachlorodiphenyl ether, polychlorobiphenyl, etc. Oiliness agents include, e.g., methyl oleate, oleic acid, stearic acid, sulfurized sperm oil, sperm oil, corn oil, etc. Pour point depressors include, e.g., wax-alkylated naphthalene or phenathrene, copolymer of butyl methacrylate with decyl methacrylate, etc. Foam inhibitors include, e.g., the polymeric dialkylsilicone, poly acrylates, etc. Viscosity index improvers include, e.g., polymerized and copolymerized alkyl methacrylates, polymerized butenes, etc.

The following lubricants illustrate the utility of the phosphorus- and nitrogen-containing compositions of this invention as additives in lubricating compositions (all percentages are by weight):

*Lubricant A.*—Gear lubricant comprising SAE 90 mineral oil containing 2% of the product of Example 1.

*Lubricant B.*—Gear lubricant comprising SAE 90 mineral oil containing 1% of the product of Example 2 and 2% of diisobutyl tetrasulfide.

*Lubricant C.*—Automobile crankcase lubricant comprising SAE 10W 30 mineral oil containing 0.5% of the product of Example 3, 0.04% of a polymeric alkylsiloxane as an anti-foam agent, and 0.1% of dodecenylsuccinic acid as a rust-preventive.

*Lubricant D.*—Crankcase lubricant for gasoline engines comprising SAE 20 mineral oil containing 1.5% of the product of Example 5, 2% of barium mahogany sulfonate, 1% of zinc dicyclohexyl phosphorodithioate, and 5% of polyisobutene having a molecular weight of 50,000 as the viscosity index improving agent.

*Lubricant E.*—Gear lubricant comprising SAE 80 mineral oil containing 3% of the product of Example 6, 3% of di(chlorobenzyl)trisulfide, 0.5% of stearamide as the oiliness agent, and 0.04% of a polymerized alkylsiloxane as the anti-foam agent.

*Lubricant F.*—Gear lubricant comprising SAE 90 mineral oil containing 5% of the product of Example 1 and 3% of a diterpenyl tetrasulfide prepared by reacting 2 moles of beta-pinene with 4 atoms of sulfur.

*Lubricant G.*—Gear lubricant comprising SAE 90 mineral oil containing 3.5% of the product of Example 12 and 1.5% of dicyclohexyl disulfide.

*Lubricant H.*—Gear lubricant comprising SAE 80 mineral oil containing 1.5% of the product of Example 8, 2% of a chlorinated eicosane having a chlorine content of 40%, and 3% of di-n-pentyl tetrasulfide.

*Lubricant I.*—Diesel engine lubricant comprising SAE 30 mineral oil containing 8% of the product of Example 13, 10% of calcium didodecylbenzene sulfonate, 3% of barium salt of di(o-hydroxyphenyl)disulfide and 3% of the reaction product of 4 moles of dipentene with 1 mole phosphorus sesquisulfide.

*Lubricant J.*—Two-cycle outboard motor lubricant comprising SAE 5 mineral oil containing 0.05% of the product of Example 23 and 0.8% of a copolymer of 2 parts of beta-diethylamine-ethyl acrylate with 98 parts of didodecyl methacrylate having a molecular weight of 20,000.

*Lubricant K.*—Automotive transmission lubricant comprising SAE 10W 30 mineral oil containing 2% of the product of Example 18, 2% of barium diisooctylphosphorodithioate, 0.25% of oleamide, 1% of didodecyl phosphite, and 3% of a basic barium sulfonate obtained by mixing mahogany acid with 2 moles of barium hydroxide and carbonating the mixture in the presence of phenol and mineral oil at 150° C.

*Lubricant L.*—Gear lubricant comprising SAE 90 mineral oil, 5% of a diisobutene polysulfide containing an average of 3.2 sulfur atoms per molecule prepared by the stepwise reaction of isobutene with sulfur monochloride and sodium sulfide, and 2% of the phosphorus- and nitrogen-containing product of Example 24 derived from a 2-hydroxyethyl substituted $C_{11}$-$C_{14}$ amine mixture. This lubricant showed superior rust-inhibiting characteristics when compared with a lubricant similar in all respects except that the phosphorus- and nitrogen-containing product was derived from a $C_{11}$-$C_{14}$ amine mixture which had not been hydroxyethyl substituted by means of ethylene oxide.

The effectiveness of the phosphorus- and nitrogen-containing compositions of this invention in enhancing the thermal stability of lubricants is shown by the following test. In this test a 20-cc. sample of the lubricant having immersed therein a 10-20 gauge steel strip (2 x 0.5 inch) is placed in a test tube at 300° F. The stability of the lubricant is measured in terms of the time required for appearance of haze or sediment, i.e., the longer the time required for appearance of haze or sediment, the more stable the lubricant. The results of this test are summarized in Table I below.

*Table I*

| Test lubricant (percent by weight): | Period within which haze or sediment appears, hours |
|---|---|
| I. Gear lubricant+3.8% of hydroxypropyl O,O′-di(4-methyl-2-pentyl)phosphorodithioate | 3 to 4.5 |
| II. Gear lubricant of (I)+3.77% of the phosphorodithioate of (I) treated with phosphorus pentoxide and amine according to the procedure of Example 7 | 52 to 57 |
| III. Gear lubricant of (I)+3.77% of the phosphorodithioate of (I) treated with phosphorus pentoxide and amine according to the procedure of Example 8 | 72 to 75.5 |
| IV. Gear lubricant+4.62% of the product of Example 9 | 34 to 46 |
| V. Gear lubricant+2.9% of the product of Example 10 | 54.5 to 59 |
| VI. Gear lubricant+3.4% of the product of Example 11 | 72 to 90 |

An important characteristic of lubricant additives is non-corrosiveness to metals. Thus the additives of this invention are evaluated as to corrosiveness by an ASTM Copper Corrosion Test (procedure designation ASTM D 130–56). The test consists of immersing a freshly polished copper strip in the lubricant, heating the lubricant at 250° F. for 3 hours, and measuring the extent of corrosion of the strip at the end of the heating period. The measurement of corrosion is accomplished by comparing the strip with a set of ASTM copper strip corrosion standards and is reported on the following scale: 1 for slight tarnish; 2 for moderate tarnish; 3 for dark tarnish; and 4 for corrosion. The lubricant used in the test is a SAE 90 mineral lubricating oil containing 3% by weight of the additive to be tested. The results of the test are summarized in Table II below. It will be noted that Additive C is prepared by the process of Example 12 except that phosphorus pentasulfide (not contemplated with the scope of this invention) is substituted on a chemically equivalent basis for the phosphorus pentoxide used and that the additive has a maximum corrosion rating and is wtihout utility for the purposes of this invention.

*Table II*

| Additive tested: | Test result (Cu-strip rating) |
|---|---|
| A. Product of Example 12 | 1 |
| B. Product of Example 21 | 2–3 |
| C. Product prepared by the procedure of Example 12 except that $P_2S_5$ is substituted for the $P_2O_5$ used | 4 |

The efficacy of the additives of this invention to impart load-carrying properties to lubricants is shown by the Timken OK Load Test (ASTM Bulletin No. 181, April 1, 1952). This test measures the load at which rupture of a film of the lubricant between the rotating cup and a stationary block and surface distress (e.g., scoring, abrasion) of the stationary block occur. Thus, the higher the load, the better the load-carrying properties of the lubricant. The results of this test are given in Table III below.

*Table III*

| Lubricant (percent additive by weight): | Test result (in duplicate) (OK load-pounds) |
|---|---|
| M. SAE 90 mineral oil | 5 |
| N. SAE 90 mineral oil +5% of product of Example 12 | 45, 50 |
| O. SAE 90 mineral oil +1.18% of product of Example 12 | 55, 55 |
| P. SAE 90 mineral oil +1.53% of product of Example 13 | 65, 55 |
| Q. SAE 90 mineral oil +1.54% of product of Example 14 | 40, 40 |
| R. SAE 90 mineral oil +1.37% of product of Example 22 | 60, 55 |
| S. SAE 90 mineral oil +1.46% of product of Example 16 | 55, 60 |
| T. SAE 90 mineral oil +1.54% of product of Example 15 | 55, 65 |
| U. SAE 90 mineral oil +1.75% of product of Example 17 | 13, 10 |
| V. SAE 90 mineral oil +1.55% of product of Example 19 | 25, 20 |
| W. SAE 90 mineral oil +1.37% of product of Example 20 | 20, 13 |
| X. SAE 90 mineral oil +1.25% of product of Example 23 | 30, 30 |
| Y. SAE 90 mineral oil +1.46% of product of Example 21 | 50, 55 |

The effectiveness of the phosphorus- and nitrogen-containing compositions of this invention as additives in gear lubricants is shown by an Axle Gear Test (CRC designation L–37). The test consists of operating a ¾ ton Dodge military truck axle having an axle ratio of 5.2:1 first under high speed low-torque conditions and then under high-torque low speed conditions. The high speed low-torque conditions are: duration, 100 minutes, axle speed, 440±5 r.p.m.; transmission gear level, high;

ring gear torque, 150±5 lbs.; and maximum temperature, 300° F. The high torque low speed conditions are: duration, 24 hours; temperature, 275°±3° F.; transmission gear level, low-load; ring gear torque, 663±5 lbs.; and engine speed, 80±1 r.p.m. After completion of the test the gears are inspected for scoring, deposit formation, and rusting. The axle lubricant is then rated on the following numerical scale: 1 representing excellent, 2 representing good, 3 representing borderline pass, 4 representing poor, and 5 representing very poor.

A gear lubricant comprising a SAE 90 mineral lubricating oil containing 7.15% (by weight) of a diisobutene polysulfide containing an average of 3.2 sulfur atoms per molecule prepared by stepwise reaction of isobutene with sulfur monochloride and sodium sulfide, is found to fail the above test with a numerical rating of 5 whereas the same lubricant except that a portion (16% by weight) of the polysulfide is replaced with the product of Example 12 is found to pass this test with a rating of 2.

The effectiveness of the phosphorus- and nitrogen-containing compositions of this invention as additives in gear lubricants for use under high speed and shock load conditions is shown by the following Axle Gear Test (CRC designation L–42). This test consists of operating a Spicer rear axle (model 44–1, obtainable from Dana Corporation, Toledo, Ohio) driven by a 1956 Chevrolet V–8 Powerglide engine first under break-in conditions, then under high speed conditions (550 wheel r.p.m. in fourth gear), and then under shock-load conditions (131 pound-foot load at 550 wheel r.p.m. in third gear). After completion of the test the gears are inspected and the lubricant is said to pass the test if the gear teeth show no appreciable surface distress, i.e., scoring, ridging, rippling, etc. The lubricant described previously for the CRC L–37 Axle Gear Test is found to pass this test (in duplicate).

What is claimed is:

1. A process for preparing phosphorus- and nitrogen-containing compositions comprising forming an acidic intermediate by reacting at a temperature of from about 25° C. to about 150° C., a hydroxy-substituted triester of a phosphorothioic acid having the formula

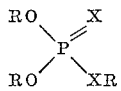

wherein R is selected from the class consisting of hydrocarbon radicals, hydroxy-substituted hydrocarbon radicals, and hydrocarbon radicals containing one polar substituent selected from the class consisting of chloro, bromo, iodo, alkoxy, aryloxy, nitro, keto, and aldehydo, at least one of the R radicals being a hydroxy-substituted hydrocarbon radical, and X is selected from the class consisting of sulfur and oxygen, at least one of the X radicals being sulfur, with an inorganic phosphorus reagent selected from the class consisting of phosphorus acids, phosphorus oxides, and phosphorus halides, the molar ratio of the hydroxy-substituted triester to inorganic phosphorus reagent being within the range of from about 2:1 to about 5:1 and neutralizing at a temperature of from about 0° to 200° C., at least about 50% of said acidic intermediate with an amine selected from the class consisting of hydrocarbon and hydroxy-substituted hydrocarbon amines having from about 4 to about 30 carbon atoms.

2. The process of claim 1 characterized further in that the inorganic phosphorus reagent is a phosphorus oxide.

3. A process for preparing phosphorus- and nitrogen-containing compositions comprising forming an acidic intermediate by reacting at a temperature of from about 25° C. to about 150° C., a hydroxy-substituted triester of a phosphorothioic acid having the formula

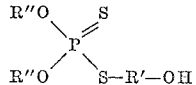

wherein R'' is a radical selected from the class consisting of hydrocarbon radicals and hydrocarbon radicals containing one polar substituent selected from the group consisting of chloro, bromo, iodo, alkoxy, aryloxy, nitro, keto, and aldehydo, and R' is a bivalent hydrocarbon radical selected from the class consisting of alkylene and arylene radicals with phosphorus pentoxide, the molar ratio of the hydroxy-substituted triester to phosphorus pentoxide being within the range of from about 2:1 to about 5:1, and neutralizing at a temperature of from about 0° to 200° C. at least about 50% of said acidic mixture with an amine selected from the class consisting of hydrocarbon and hydroxy-substituted hydrocarbon amines having from about 4 to about 30 carbon atoms.

4. The process of claim 3 characterized further in that the amine is a hydroxy-substituted amine.

5. The process of claim 3 characterized further in that the amine is a hydroxy-substituted aliphatic amine.

6. The process of claim 3 characterized further in that the amine is a N-monohydroxyalkyl substituted mono-tertiary-alkyl amine wherein the tertiary-alkyl radical contains from about 11 to about 24 carbon atoms.

7. The process of claim 3 characterized further in that R'' and R' of the formula are aliphatic radicals.

8. The process of claim 3 characterized further in that R'' of the formula is an aliphatically-substituted aromatic radical and R' of the formula is an aliphatic radical.

9. The process of claim 3 characterized further in that R'' of the formula is an alkyl radical, R' is an alkylene radical, and the amine is an aliphatic amine having from about 4 to about 30 carbon atoms.

10. The process of claim 3 characterized further in that R'' of the formula is an alkaryl radical, and R' of the formula is an alkylene radical.

11. The process of claim 3 characterized further in that the reaction of the hydroxy-substituted triester of a phosphorodithioic acid with phosphorus pentoxide is carried out at a temperature within the range from about 50° C. to about 150° C.

12. A process for preparing phosphorus- and nitrogen-containing compositions comprising forming an acidic intermediate by the reaction of a hydroxy-substituted triester of a phosphorodithioic acid having the formula

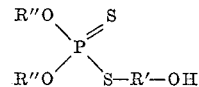

wherein R'' is an aliphatic radical having from about 3 to about 30 carbon atoms and R' is a lower alkylene radical with phosphorus pentoxide at a temperature within the range from about 50° C. to about 150° C., the molar ratio of the hydroxy-substituted triester to phosphorus pentoxide being within the range from about 2:1 to about 5:1, and neutralizing said acidic intermediate at a temperature of from about 0° C. to about 200° C., with a substantially equivalent amount of an aliphatic amine having from about 4 to about 30 carbon atoms.

13. The process of claim 12 characterized further in that R'' of the formula is an alkyl radical and the aliphatic amine is a tertiary-alkyl primary amine.

14. A process for preparing phosphorus- and nitrogen-containing compositions comprising forming an acidic intermediate by the reaction of hydroxypropyl O,O'-dihexyl phosphorodithioate with phosphorus pentoxide at a temperature within the range from about 50° C. to about 150° C., the molar ratio of the phosphorodithioate to phosphorus pentoxide being about 3:1, and neutralizing said acid intermediate at a temperature of from about 0° C. to about 200° C. with a substantially equivalent amount of an aliphatic primary amine having about 12 carbon atoms.

15. A process for preparing phosphorus- and nitrogen-containing compositions comprising forming an acetic intermediate by the reaction of hydroxypropyl O,O'-diheptylphenyl phosphorodithioate with phosphorus pentoxide at a temperature within the range from about 50° C. to about 150° C., the molar ratio of the phosphorodithioate to phosphorus pentoxide being about 3:1, and neutralizing said acidic intermediate at a temperature of from about 0° C. to about 200° C., with a substantially equivalent amount of an aliphatic primary amine having about 12 carbon atoms.

16. The product of the process of claim 1.

17. The product of the process of claim 14.

18. A lubricating composition comprising a major proportion of a lubricating oil and from about 0.001% to about 10% by weight of the product of the process of claim 1.

19. A lubricating composition comprising a major proportion of a lubricating oil and from about 0.001% to about 10% by weight of the product of the process of claim 12.

20. A lubricating composition comprising a major proportion of a lubricating oil, from about 0.001% to about 10% by weight of the product of the process of claim 1, and from about 0.05 to about 10% of a hydrocarbon polysulfide containing at least about 6 carbon atoms.

21. A lubricating composition in accordance with claim 20 wherein the hydrocarbon polysulfide is an aliphatic polysulfide.

22. A lubricating composition in accordance with claim 21 wherein the aliphatic polysulfide is an alkyl polysulfide containing at least 2 but less than 6 sulfur atoms.

23. A lubricating composition in accordance with claim 21 wherein the aliphatic polysulfide is a diisobutene polysulfide containing at least 2 but less than 6 sulfur atoms.

24. A lubricating composition comprising a major proportion of a mineral lubricating oil, from about 0.001% to about 10% by weight of the product of the process of claim 12, and from about 0.05 to about 10% of a diisobutene polysulfide containing an average of 3.2 sulfur atoms.

References Cited by the Examiner

UNITED STATES PATENTS

| | | | |
|---|---|---|---|
| 3,002,014 | 9/61 | Dinsmore et al. | 252—32.7 |
| 3,004,996 | 10/61 | Arakelian et al. | 252—32.7 |

DANIEL E. WYMAN, *Primary Examiner.*